United States Patent [19] [11] Patent Number: 4,827,431
Goldshtein [45] Date of Patent: May 2, 1989

[54] METHODS AND SYSTEMS FOR THE SIMULTANEOUS QUANTITATIVE MEASUREMENT OF PHASE AND AMPLITUDE JITTER IMPAIRMENTS AND SIGNAL TO NOISE RATIO IN A QAM DATA COMMUNICATION CHANNEL

[75] Inventor: Yury A. Goldshtein, Southbury, Conn.

[73] Assignee: General DataComm, Inc., Middlebury, Conn.

[21] Appl. No.: 5,094

[22] Filed: Jan. 20, 1987

[51] Int. Cl.[4] .................... G06K 15/00; H03F 1/266; H04L 7/00
[52] U.S. Cl. .................................. 364/514; 364/574; 375/118
[58] Field of Search ............... 364/514, 574, 575; 375/10, 39, 118; 455/60, 67

[56] References Cited

U.S. PATENT DOCUMENTS 4,027,250  5/1977  Lang ........................... 375/39
4,381,540  4/1983  Armstrong .................... 364/514
4,631,738  12/1986  Betts et al. ................... 375/118

Primary Examiner—Theodore M. Blum
Assistant Examiner—Gregory C. Issing
Attorney, Agent, or Firm—David P. Gordon

[57] ABSTRACT

Methods and systems are disclosed for simultaneously measuring three impairments such as phase jitter, amplitude jitter, and noise, to a quadrature amplitude modulated data communication channel. The invention generally comprises: correlating received signals to an ideal constellation point; rotating the received signals and ideal constellation point such that the ideal point lies on the x axis; determining a phase jitter index ($\cos\alpha$) as a function ($\bar{x}/x_o$) of the average x coordinates of the rotated received signals and the rotated constellation point; determining an index of amplitude jitter ($m^2$) as a function $(((\overline{x^2}-\overline{y^2})/(2\bar{x}_p^2-x_o^2))-1)$ of the square of average x coordinates, the average of the square of the x coordinates, the average of the square of the y coordinates of the rotated received point, and the square of the rotated constellation point; and determining a noise index $\overline{\Delta x_n^2}$ as a function $((\overline{x^2}+\overline{y^2}-x_o^2(1+m^2))/2)$ of the average of the square of the x coordinates, the average of the square of the y coordinates, the square of the rotated constellation point, and the amplitude jitter index. The system invention generally comprises means for accomplishing the method invention.

16 Claims, 2 Drawing Sheets

METHODS AND SYSTEMS FOR THE SIMULTANEOUS QUANTITATIVE MEASUREMENT OF PHASE AND AMPLITUDE JITTER IMPAIRMENTS AND SIGNAL TO NOISE RATIO IN A QAM DATA COMMUNICATION CHANNEL

BACKGROUND OF THE INVENTION

The present invention generally relates to data communications, and more particularly to systems and methods for simultaneously measuring the phase and amplitude jitter impairments and the signal to noise ratio of a quadrature amplitude modulated data communication channel.

It has long been desired to measure the line impairments in a data communication system employing quadrature amplitude modulation (QAM). Indeed, many inventions have been directed toward the same, including, e.g., U.S. Pat. No. 4,381,546 to Armstrong; U.S. Pat. No. 3,924,188 to Hofbauer; and U.S. Pat. No. 4,555,790 to Betts et al., which among them portend to solve for phase jitter, amplitude jitter, noise, harmonic distortion, and frequency offset in different manners.

Among the various line impairments, it would be especially advantageous to solve simultaneously for phase jitter, amplitude jitter, and noise. However, as is readily appreciated, in QAM systems only two pieces of data (the x and y coordinates of a received point) are measurable from which the line impairment information may be gleaned. Thus, only two known variables are available for solving three simultaneous equations. The prior art, including the above-cited patents, have responded to this problem by either ignoring all other impairments in solving for two impairments simultaneously, or, as in the Armstrong U.S. Pat. No. 4,381,546, opted to solve for more than two impairments in a separate manner. When solving separately, all the error is assigned to a particular impairment even the error might be the result of another impairment. Neither approach is optimal, and the fact that this problem is particularly troublesome to the art is evidenced by U.S. Pat. No. 4,555,790 to Betts et al. which states that "[since] for signals located relatively far from the origin the (error) is due to noise, . . . (and) phase and amplitude errors, the (Betts, et al. invention) is adapted to respond only to . . . signals . . . where the effects of . . . phase and amplitude errors and negligible". Indeed, this is good evidence that none of the known art can solve simultaneously in an accurate manner for three impairments when all three are simultaneously present in the QAM system.

SUMMARY OF THE INVENTION

It is therefore an object of the present invention to provide a method and system for simultaneously determining three impairments on a QAM data communication channel.

It is another object of the invention to provide a method and system for simultaneously determining the amplitude jitter, phase jitter, and noise on a QAM data communication channel.

It is a further object of the present invention to determine simultaneously the amount of amplitude jitter, phase jitter, and noise on a QAM data communication channel by making use of the distinct properties of each of the impairments.

In accord with the objects of the invention, a method for measuring at least one impairment in a QAM data communication channel having at one time at least three impairments, generally comprises:

(a) receiving a signal as a result of a known transmitted signal, and determining to which ideal point in a predetermined constellation said received signal corresponds;

(b) rotating said received signal by an operand determined by the ideal point to which said received signal corresponds;

(c) determining the x and y coordinates of said received signal after rotation;

(d) from said determined x and y coordinates of said rotated received signal, determining at least $\bar{x}$, $\bar{x}^2$, $\overline{x^2}$, and $\overline{y^2}$, where $\bar{x}$ is the average of the x coordinate of the rotated received point, $\bar{x}^2$ is the square of $\bar{x}$, $\overline{x^2}$ is the average of the square of the x coorindate of the rotated received point, and $\overline{y^2}$ is the average of the square of the y coordinate of the rotated received point;

(e) from said determined ideal point, determining at least $x_o^2$ where $x_o^2$ is the square of the x coordinate of the ideal point after rotation by said operand; and (f) from at least said $\bar{x}, \bar{x}^2, \overline{x^2}, \overline{y^2}$, and $x_o^2$, determining at least one of said impairments, wherein said three impairments include a first impairment which has a non-zero average effect on a coordinate of the received rotated signals, and two additional impairments where the average effect of each of the two other impairments on a coordinate of said received rotated signal is zero.

Preferably, according to the method, the impairment having the non-zero average effect on the measured coordinate is phase jitter, and the two other independent impairments are amplitude jitter and noise. Also, preferably, the invention further comprises determining $x_o$ and $x_o$ is the x coordinate of the ideal point after rotation by said operand. Further, preferably, $x_o^2$ is used to determine the impairments. Further yet, according to the method, values for an index of the phase jitter ($\cos\alpha$), an index of the amplitude jitter ($m^2$), and an index of the noise ($\Delta N^2$) are computed as follows:

$$\cos\alpha = x/x_o;$$

$$m^2 = ((\overline{x^2} - \overline{y^2})/(\overline{2x^2} - x_o^2)) - 1$$

$$\overline{\Delta x_N^2} = (\overline{x^2} + \overline{y^2} - x_o^2(1+m^2))/2$$

The system for determining at least one impairment in a channel simultaneously having phase jitter, amplitude jitter, and noise, generally comprises means for accomplishing the method steps above.

A better understanding of the invention, and additional advantages and objects of the invention will become apparent to those skilled in the art upon reference to the detailed description and the accompanying drawings.

DETAILED DESCRIPTION OF THE PREFERRED EMBODIMENT

Figure 1:
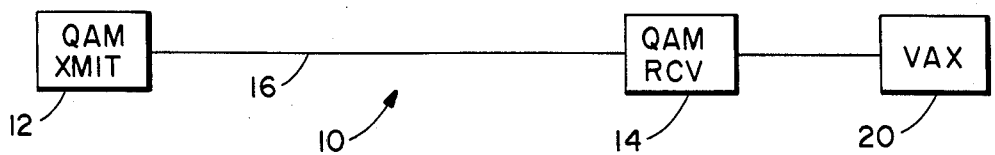
FIG. 1 is block diagram of the system invention for measuring and computing at least one channel impairment where two channel impairments having averages of zero, and one channel impairment having a non-zero average are all simultaneously present on a channel.

Turning to FIG. 1, the communications system 10 of the invention is seen. The system typically comprises a QAM transmitter 12 for generating and transmitting signal constellations at predetermined bit rates, a QAM receiver 14 for receiving the transmitted signals and detecting the phase and amplitudes of the received signals, a communications channel 16 such as a telephone line for permitting communication between the transmitter 12 and receiver 14, and a calculating means 20 such as a microcomputer for calculating impairment values as a function of the values of the transmitted and detected signals. It will be appreciated that many QAM transmitters and receivers which can accomplish the aforesaid tasks are known in the art and commercially available, and the speed, signal constellation size capacity, etc. of the transmitters and receivers are unimportant for purposes of the invention herein. It will also be appreciated that various calculating means are known in the art which can accomplish the calculations required as hereinafter described. Moreover, various communications channels such as microwave links, telephone lines, etc. are known in the art. While those providing the channels attempt to keep channel impairments to a minimum, communication channels tend to have various types of impairments such as, e.g. phase jitter, amplitude jitter, noise, harmonic distortion, and frequency offset. For purposes herein, it will be assumed that the channel 16 has at least one impairment having a non-zero average such as phase jitter, and two other independent impairments having average values of zero such as amplitude jitter and noise. It should be appreciated, at the outset, that the term "non-zero average" is intended to convey the fact that the average effect of the "non-zero average" impairment on the measured coordinate of the received (and rotated) signals is to produce an average signal which has a different value on the measured axis than the transmitted signal. Likewise, it should be appreciated that the term "average value of zero" is intended to convey the fact that the average effect of the "zero average" impairment on the measured coordinate of the received (and rotated) signals is to produce an average signal which has an identical value on the measured axis to the transmitted signal.

According to the invention, and as taught in U.S. Pat. No. 4,381,546 to Armstrong, when a point tansmitted by QAM transmitter 12 is received by the QAM receiver 14, the point is preferably rotated towards the x axis. Thus, if a received point is determined to be an ideal point (i.e. exactly equal to the transmitted point) in the first quadrant, its complex value $(x+jy)$ is multiplied by $(1-j)$; while if the point is determined to be in the second, third, or fourth quandrants, the point would be multiplied by $(-1-j)$, $(-1+j)$, and $(1+j)$ respectively to yield a point with its nominally maximum component on the positive real axis. Of course, however, the received point does not usually equate to an ideal transmitted point. Rather, because of channel impairments, the received point will have some error associated with it. Thus, after rotation by the afroestated complex values, the received point will not lay exactly on the x axis.

Figure 2A:
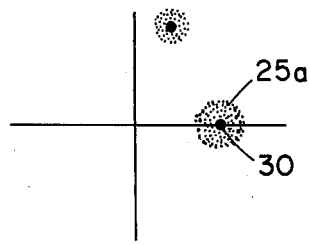
FIGS. 2a–2c are graphs of a received and rotated point which was transmitted on a line in the presence of only noise, amplitude jitter or phase jitter respectively.
Figure 2B:
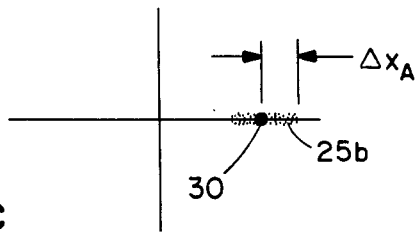
Figure 2C:
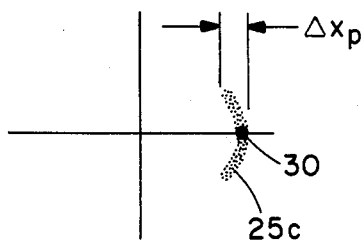

The error introduced by various types of impairments may be seen in FIGS. 2a through 2c. In FIG. 2a, a (repeatedly) transmitted point which was subject only to Gaussian noise in the channel is seen as received, measured, and rotated. The scatter 25a around the ideal rotated location 30 appears to be circular. As a result, it should be appreciated that the following relationships are true for noise:

$$\overline{\Delta x_N^2} = \overline{\Delta y_N^2} \qquad (1)$$

$$\overline{\Delta x_N} = \overline{\Delta y_N} = 0 \qquad (2)$$

Equations (1) and (2) are true because of the nature of Gaussian noise which is symmetrical as well as identically distributed along both axes. Equation (1) may also be understood by noting that the scatter is circular. Likewise, Equation (2) may also be understood by realizing that noise is just as likely to have a negative value as a positive one.

Turning to FIG. 2b, the amplitude jitter associated with a channel is seen to cause a scatter 25b along the x axis around the ideal rotated point 30. As a result, the following relationship for amplitude jitter may be derived:

$$\overline{\Delta x_A} = 0 \qquad (3)$$

In other words, the amplitude jitter is just as likely to cause an increase or a decrease in the amplitude of the signal.

With respect to FIG. 2c, it is seen that phase jitter associated with a channel causes a scatter 25c around the ideal rotated point 30 which forms an arc with its center at the origin. Thus it will be appreciated that $\overline{\Delta x_P} \neq 0$. Indeed, with phase jitter, the average x value will always be less than the x value of the ideal point. As a result, and as will be discussed below with regard to FIG. 3, the following relationship for phase jitter may be derived:

$$x_P = x_o \cos \alpha \qquad (4)$$

where $\alpha$ is the angle formed between the positive x axis and the vector corresponding to the received rotated point, and where $x_o$ is the coordinate of the ideal received point after rotation. It will also be seen herinafter, that this asymmetry will permit the simultaneous solving of phase jitter and two impairments other than phase jitter which have their average x values equal to zero, when all three are present in the channel.

Figure 3:
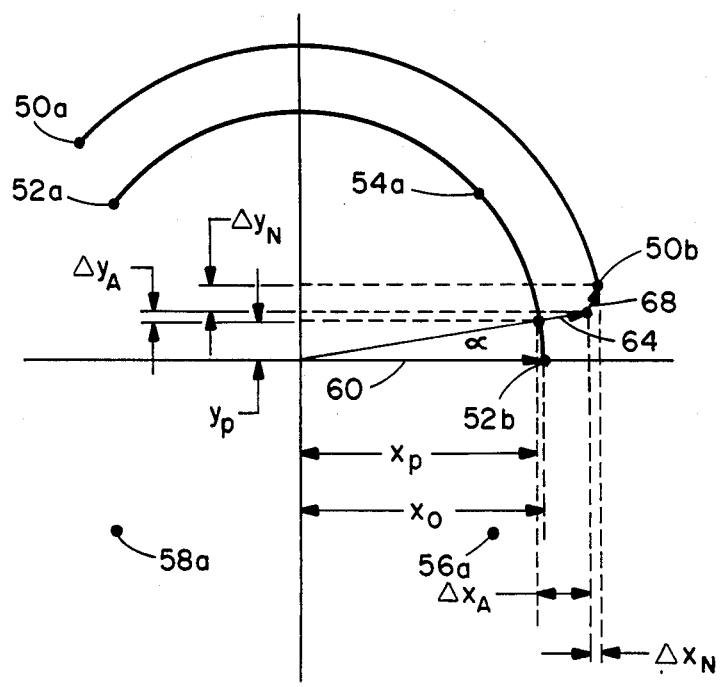
FIG. 3 is a graph of a received and rotated point which was transmitted on a line in the presence of noise, amplitude jitter, and phase jitter simultaneously.

The location of a received and rotated point with all three impairments (phase jitter, amplitude jitter, and noise) present, as it relates to the ideal rotated point, is seen in FIG. 3. Thus, if a point 50a is received by the received 14, a decision is made as to which ideal constellation point (e.g. 52a, 54a, 56a, 58a . . . ) the received point 50a corresponds. Assuming that point 50a corresponds to ideal point 52a, the two points may be rotated such that ideal point 52a is rotated to lie on the x axis (52b), and point 50a lies near the x axis (50b). Point 50b may be then theoretically visualized as comprising the sum of the rotated ideal vector 60 which is rotated through angle α due to phase jitter, and amplitude jitter vector 64, and noise vector 68. Thus, the x and y coordinates of the received rotated point 50b may be described by:

$$x = x_P + \Delta x_A + \Delta x_N \quad (5)$$

$$y = y_P + \Delta y_A + \Delta y_N \quad (6)$$

where $x_p$ and $y_p$ are the projections of the rotated received vector having phase jitter only onto the x and y axes respectively, $\Delta x_A$ and $\Delta y_A$ are the projections of amplitude jitter vector 64 onto the x and y axes respectively, and $\Delta x_N$ and $\Delta y_N$ are the projections of the noise vector 68 onto the x and y axes respectively. From FIG. 3, it can also be seen geometrically (as stated above in equation (4)) that $x_P = x_o \cos\alpha$ and that:

$$y_P = x_o \sin\alpha \quad (7)$$

as the length of the vector from the origin to point 50b is equal to the length of $x_o$ because one is the rotation of the other.

From equations (5) and (6), the following equations which are useful in simultaneously solving for all three impairments may be derived:

$$\overline{x^2} = \overline{x_P^2} + \overline{\Delta x_A^2} + \overline{\Delta x_N^2} \quad (8)$$

$$\overline{y^2} = \overline{y_P^2} + \overline{\Delta y_A^2} + \overline{\Delta y_N^2} \quad (9)$$

It will be appreciated that all cross terms which result from squaring equations (5) and (6) are dropped from equations (8) and (9) due to the fact that $\overline{\Delta x_A} = \overline{\Delta x_N} = 0$ (as seen in equations (2) and (3)), and that one or both of those terms are in each cross term. Also, from equations (4), (5) and (7), the following useful equations may be defined:

$$\overline{x} = \overline{x_P} = x_o \overline{\cos\alpha} \quad (10)$$

$$\overline{x_P^2} = x_o^2 \overline{\cos^2\alpha} \quad (11)$$

$$\overline{y_P^2} = x_o^2(1 - \overline{\cos^2\alpha}) = x_o^2(1 - (\overline{x_P^2}/x_o^2)) \quad (12)$$

Clearly, equation (10) derives from equation (5) and the fact that the average amplitude jitter and noise signal are both zero by definition. Equation (11) is derived from equation (10). Equation (12) is derived from equation (7), the fact that the $\sin^2 = 1 - \cos^2$, and a rearrangement of equation (10). Further, the following may be derived directly from equations (10) and (11):

$$\overline{x_P^2}/\overline{x_P}^2 = x_o^2\overline{\cos^2\alpha}/x_o^2\overline{\cos\alpha}^2 \approx 1 \quad (13)$$

where α<0.5 radians. The fact that the ratio is approximately equal to one may be seen from the following table:

| | α max | | | | | |
|---|---|---|---|---|---|---|
| | 0 | 0.1 | 0.2 | 0.3 | 0.4 | 0.5 |
| Uniform dist. of α | 1 | 0.999 | 0.999 | 0.999 | 0.999 | 0.998 |
| Simpson dist. of α | 1 | 0.999 | 0.999 | 0.999 | 0.999 | 0.999 |

As a result of equation (13), it is seen that $\overline{x_P}^2$ is a close approximation of $\overline{x_P^2}$.

With the addition of one more equation set, it will be seen hereinafter that the above equations may be used to simultaneously solve for three impairments (e.g. phase jitter, amplitude jitter, and the noise or signal/noise ratio of a channel) even though only two measured points (the x and y coordinates) are available. Thus, for simplification purposes, an index of amplitude modulation m is introduced, with the instantaneous jitter $m_{inst}$ being equal to the length of vector 64 ($A_{jit}$) divided by $x_o$. From FIG. 3, and the definition of $m_{inst}$ it is seen that:

$$\Delta y_A = A_{jit}\sin\alpha = m_{inst}x_o\sin\alpha \quad (14)$$

From equation (14) and from the knowledge that $m^2 = \overline{m^2_{inst}}$, the following is derived:

$$\overline{\Delta y^2_A} = \overline{m^2 x_o^2 \sin^2\alpha} = m^2 x_o^2(1 - \overline{\cos^2\alpha}) \quad (15)$$

And, from equations (11) and (13) it is seen that $$m^2 x_o^2(1 - \overline{\cos^2\alpha}) = \quad (16)$$

$$m^2 x_o^2(1 - (\overline{x_P^2}/x_o^2)) =$$

$$m^2 x_o^2(1 - (\overline{x_P}^2/x_o^2))$$

Further, it will be appreciated that:

$$\overline{\Delta x_A} = \overline{m^2 x_o^2 \cos^2\alpha} = m_2 x_o^2(\overline{x_P^2}/x_o^2) = m^2 \overline{x_P}^2 \quad (17)$$

From equations (8), (13) and (17) it will be seen that:

$$\overline{x^2} = \overline{x_P}^2 + m^2\overline{x_P}^2 + \overline{\Delta x_N^2} \quad (18)$$

And, from equations (9), (12), (15), and (16), it is seen that:

$$\overline{y^2} = x_o^2 - \overline{x_P}^2 + m^2 x_o^2 - m^2\overline{x_P}^2 + \overline{\Delta x_N^2} \quad (19)$$

Now, the index m of the amplitude jitter modulation may be solved by first subtracting the results of equation (19) from those of equation (18):

$$\overline{x^2} - \overline{y^2} = 2\overline{x_P}^2 - x_o^2 + m^2(2\overline{x_P}^2 - x_o^2) \quad (20)$$

and by solving for $m^2$ such that:

$$m^2 = \frac{\overline{x^2} - \overline{y^2} - 2\overline{x}^2 + x_o^2}{2\overline{x}^2 - x_o^2} \quad (21)$$

Thus, it is seen that the amplitude jitter may be indexed by the index m (or $m^2$) such that $m^2$ has a value of $((\overline{x^2} - \overline{y^2})/(2\overline{x}^2 - x_o^2)) - 1$. It should be appreciated that the value of $m^2$ is always greater than or equal to zero in accord with equation (21). Thus, if there is no phase jitter, y is equal to zero, and $\overline{x}$ becomes equal to $x_o$. Thus, $m^2$ is set equal to $(\overline{x^2}/x_o^2) - 1$, and because in the presence of amplitude jitter $\overline{x^2}$ is always greater than $x_o^2$ (the square of the ideal received point), the term $\overline{x^2}/x_o^2$ is always greater than one, and the value of $m^2$ is always greater than zero. If there is no amplitude jitter, $\overline{x}$ becomes equal to $x_o$, and the term $\overline{x^2}/x_o^2$ becomes one. Hence, $m^2$ is set equal to zero which bears out the assumption. In the presence of phase jitter it should be appreciated that $\overline{x_P}$ or $\overline{x}$ becomes less than $x_o$ (as seen in FIG. 2c), and therefore the denominator of equation (21) decreases to offset the decrease in the numerator.

Because x, y, and $x_o$ values are measured or known for each received point, and because $\overline{x_P} = \overline{x}$ according to equation (10), it should be appreciated that an amplitude jitter may be determined simply by measuring x and y and knowing $x_o$. As described with reference to FIG. 4, the x and y values must be squared and averaged, while the x value must also be averaged and then squared to determine the index m or $m^2$.

Equations (18) and (19) are additionally useful for making a noise determination. Thus, it will be seen that the average square of the noise may be determined by adding $\overline{x^2}$ and $\overline{y^2}$:

$$\overline{x^2}+\overline{y^2}=(1+m^2)x_o^2+\overline{\Delta x_N^2} \quad (22)$$

and solving for $\overline{\Delta x_N^2}$:

$$\overline{\Delta x_n^2}=(\overline{x^2}+\overline{y^2}-x_o^2(1+m^2))/2 \quad (23)$$

Since $m^2$ is determinable by known or measurable values as aforedescribed with reference to the amplitude jitter, and because the remaining variables are all functions of x, y and $x_o$, it will be appreciated that the noise may be determined in the presence of phase and amplitude jitter. It will also be appreciated that a signal to noise ratio (S/N) may be determined by defining the signal as $x_o^2$, and dividing the signal value by the noise value determined at equation (23) above.

Turning to the phase jitter determination, it will be appreciated that the angle $\alpha$, or some function thereof such as the cosine, may be used to index the phase jitter. Thus, the phase jitter may be defined as:

$$\cos\alpha=\overline{x_P}/x_o=\overline{x}/x_o \quad (24)$$

Or, the average peak angle $\alpha$ may be derived as $\cos^{-1}(\overline{x}/x_o)$. Again, because x is measurable, and $x_o$ is known for each measured vector, the phase jitter determination is easily made.

In sum, then, it will be seen that a separate phase jitter determination, amplitude jitter determination, and noise determination may all be accurately and simultaneously made on a communication channel having all three impairments. In other words, even where all three impairments exist simultaneously, the error introduced by each may be separately and accurately determined in accord with the teachings above.

Figure 4:
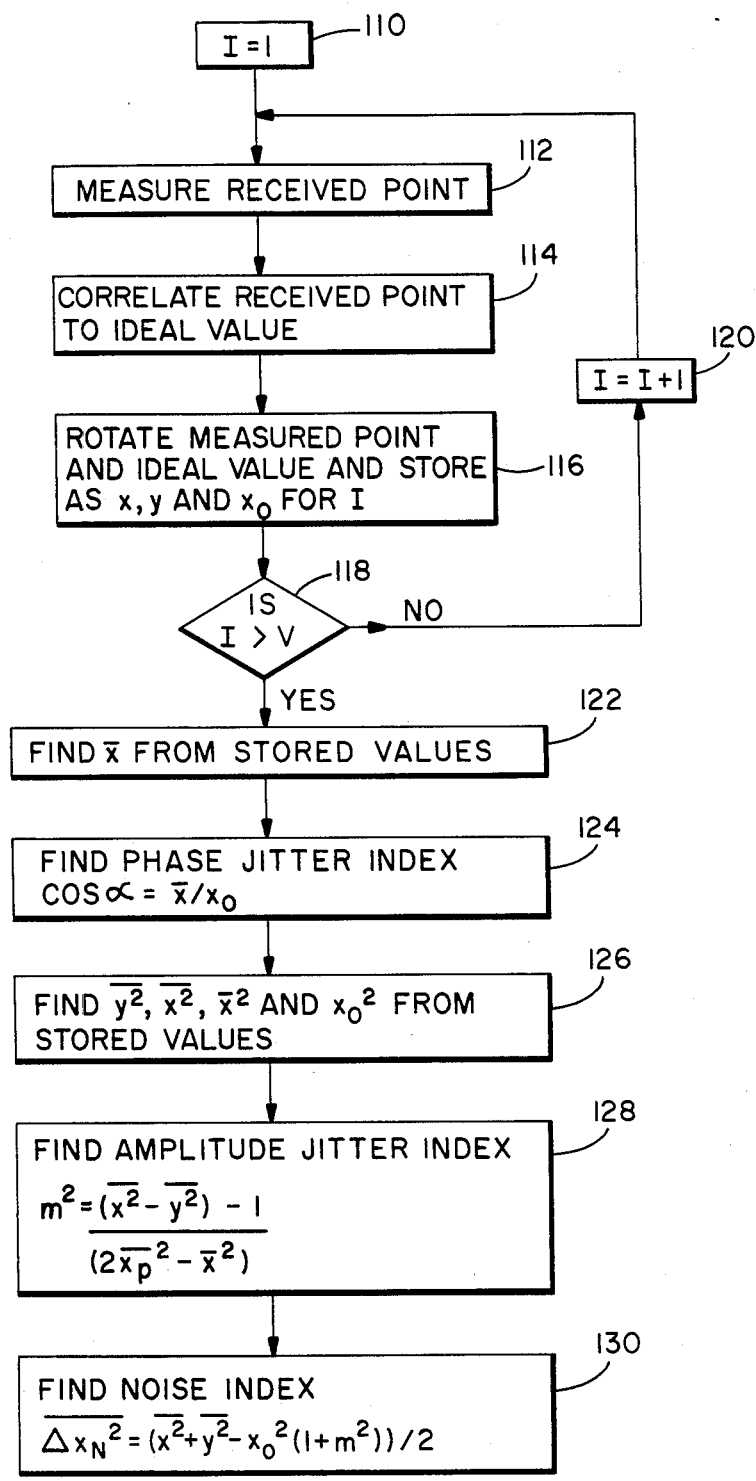
FIG. 4 is a flow chart setting forth the method invention for measuring and computing at least one channel impairment where two channel impairments having averages of zero, and phase jitter are all simultaneously present on a channel.

Turning to FIG. 4, a flow chart of the method for determining the phase jitter, amplitude jitter, and noise in a QAM data communication channel is shown. Initially, at step 110 an indexer I which will track the number of QAM transmitted points used in making the impairment determination is set to zero. When a signal is received, the signal is "measured" at 112 so that a correlation may be made at 114 and the received signal may be assigned to the ideal value in a predetermined constellation to which it represents. At 116 the measured point and ideal value are rotated by the same amount towards the x axis such that the ideal point will lie directly on the x axis. The point along the x axis upon which the ideal point falls is taken as $x_o$, and the value of $x_o$ is stored along with the x and y coordinates of the received rotated point for the indexer I=1. At step 118 a determination is made as to whether enough sample points have been received upon which the impairment determinations can be made. Thus, if the value of I is less than a certain value V, the indexer is incremented at 120 and the cycle is repeated for another point. Typically, the $x_o$ value for the all incoming points measured at 112 will be identical so that the x and y values of the measured rotated points which are stored for different index values I at 116 may all be used together in the averaging determinations made at steps 122 and 126 described below. If different $x_o$ values are obtained for the measured and indexed points, those skilled in the art will appreciate that the averaging determinations must separately be made with regard to each value $x_o$. In other words, only those values which correspond to a particular $x_o$ will be averaged together.

Once a determination is made at step 118 that enough data points have been gathered, the phase jitter determination may be made by first finding at 122 the average measured rotated x values of all points corresponding to an $x_o$ ideal point, and then dividing the average x by the $x_o$ value at 124 to yield an average $\cos\alpha$ determination. As aforementioned, if the phase jitter is to be expressed as a peak angle, the inverse cosine of the $\overline{x}/x_o$ value may be taken, thereby yielding an average peak phase jitter angle. Of course, if desired, the phase jitter value may also be expressed in terms of radians rather than degrees.

In finding the amplitude jitter and noise, first it is necessary at step 126 to find the average of the square of the stored y values, the square of the average of the stored x values, the average of the square of the stored x values, and the square of the $x_o$ value to which the measured and rotated x and y values relate. Then, at 128, an index of modulation of the amplitude jitter $m^2$ is determined according to equation (21), with the $\overline{x^2}$, $\overline{y^2}$, and $x_o^2$ values being previously determined at step 126. With the $m^2$ value as so determined, the noise index $\overline{\Delta x_n^2}$ is found at step 130 according to equation (23), with the $\overline{x^2}$, $\overline{y^2}$, $x_o$ and $m^2$ values coming from steps 126 and 128. Of course, if desired, instead of using the $m^2$ value determined at 128 for determining the noise index, the equation set forth in step 128 may be substituted into the equation of step 130. Also, it should be noted, that a signal to noise ratio may be had by dividing the signal power value by twice the noise index; i.e. by $2\overline{\Delta x_n^2}$. Twice the noise index is used as the average power includes y values where the noise index only included the x coordinate values. The signal power value is the average power of the constellation which is typically known in advance and equals:

$$(x_i^2+y_i^2)/M$$

where M is the number of samples used in the power calculation. It will be appreciated that where all the transmitted points correlate to a single point in the constellation, the average power reduces to $2x_o^2$.

There has been described and illustrated herein systems and methods for simultaneously measuring three impairments to a quadrature amplitude modulated data communication channel such as phase jitter, amplitude jitter, and noise. While particular embodiments of the invention have been described, it is not intended that the invention be limited thereby, as it is intended that the invention be broad in scope and that the specifications be read likewise. Thus, those skilled in the art will recognize that a plethora of changes can be made to the details of the methods and systems without deviating from the invention. For example, while the impairments to the channel were described as being indexed according to particular indices such as $m^2$ for amplitude jitter, $\cos\alpha$ for phase jitter, and $\overline{\Delta x_n^2}$ for noise, it will be apparent that other indices may just as easily be used. Thus, m would be a totally sufficient index for amplitude jitter, $\alpha$ for phase jitter, and $\sqrt{\overline{\Delta x_n^2}}$ for noise. Likewise, the noise index may be expressed as a noise to signal or signal to noise ratio to obtain valuable information.

Further, it should be understood that while the detailed description concerned itself with the simultaneous determination of phase and amplitude jitter and noise impairments, a similar simultaneous determination of phase jitter and two other impairments each having a zero average effect on the measured x coordinate of the rotated signal may be had in accord with the techniques of the invention. Thus, the value of the phase jitter could still be determined according to equation (24) because the value of x would not be changed by the two zero average value impairments. Moreover, the two zero average value impairments could be solved for due to the fact that the third unkown (phase jitter) is determined, and hence there would be two equations with only two unknowns (the impairments themselves). Therefore, it will be apparent to those skilled in the art that other changes and modifications may be made to the invention as described without departing from the spirit and scope of the invention as so claimed.

I claim:

1. A method for determining at least phase jitter in a QAM data communication channel, said channel having at one time at least phase jitter, and two other independent impairments, the method comprising:
   (a) receiving a signal as a result of a transmitted signal, and determining to which ideal point in a predetermined constellation said received signal corresponds;
   (b) rotating said received signal by an operand defined by the ideal point to which said received signal corresponds wherein an application of said operand to the ideal point would rotate the ideal point to an x axis;
   (c) determining an x coordinate of said received signal after rotation;
   (d) from said determined x coordinate of said rotated received signal, determining at least $\bar{x}$, where $\bar{x}$ is an average of the x coordinate of the rotated received point;
   (e) from said determined ideal point, determining at least $x_o$ where $x_o$ is an x coordinate of the ideal point after rotation by said operand; and
   (f) from at least said $\bar{x}$ and said $x_o$, determining an index of said phase jitter in said channel, wherein an average effect of each of said two other impairments on a coordinate of said received rotated signal is zero.

2. A method according to claim 1, wherein: said index of said phase jitter determined at step (f) is a cosine of the average peak angle which is determined to equal $\bar{x}/x_o$.

3. A method according to claim 1, wherein said two other independent impairments include at least amplitude jitter, further comprising:
   (g) determining a y coordinate of said received signal after rotation;
   (h) determining $\overline{x^2}$, $\bar{x}^2$, and $\overline{y^2}$, where
   $\bar{x}^2$ is a square of $\bar{x}$,
   $\overline{x^2}$ is an averge of a square of the x coordinate of the rotated received point, and
   $\overline{y^2}$ is an average of a square of the y coordinate of the rotated received point;
   (i) determining $x_o^2$, where $x_o^2$ is a square of the x coordinate of the ideal point after rotation by said operand; and
   (j) from $\bar{x}^2$, $\overline{x^2}$, $\overline{y^2}$, and $x_o^2$, further determining an index of the amplitude jitter in said channel.

4. A method according to claim 3, wherein: said amplitude jitter index determined at step (j) is an amplitude jitter modulation $m^2$ which is determined to equal $((\overline{x^2} - \overline{y^2})/(2\bar{x}^2 - x_o^2)) - 1$.

5. A method according to claim 1, wherein said two other independent impairments include at least noise, further comprising:
   (g) determining a y coordinate of said received signal after rotation;
   (h) determining $\overline{x^2}$, $\bar{x}^2$, and $\overline{y^2}$, where
   $\bar{x}^2$ is a square of $\bar{x}$,
   $\overline{x^2}$ is an average of a square of the x coordinate of the rotated received point, and
   $\overline{y^2}$ is an average of a square of the y coordinate of the rotated received point;
   (i) determining $x_o^2$, where $x_o^2$ is a square of the x coordinate of the ideal point after rotation by said operand; and
   (j) from $\bar{x}^2$, $\overline{x^2}$, $\overline{y^2}$, and $x_o^2$, further determining an index of noise in said channel.

6. A method according to claim 5, wherein: said index of noise determined at step (j) is determined to equal $$(\overline{x^2} + \overline{y^2} = x_o^2(\overline{x^2} - \overline{y^2})/2\bar{x}^2 - x_o^2))/2.$$

7. A method according to claim 3, wherein: said two other independent impairments include noise; and an index of said noise is further determined at step (j).

8. A method according to claim 4, wherein: said two other independent impairments include noise; an index of said noise is further determined at step (j); said index of phase jitter determined at step (f) is determined to equal $\bar{x}/x_o$; and said index of noise determined at step (j) is determined to equal $$(\overline{x^2} + \overline{y^2} - x_o^2(\overline{x^2} - \overline{y^2})/2\bar{x}^2 - x_o^2))/2.$$

9. A method for measuring at least an impairment other than phase jitter in a QAM data communication channel, said impairment being independent and said channel having at one time at least phase jitter, amplitude jitter, and noise, the method comprising:
   (a) receiving a signal as a result of a known transmitted signal, and determining to which ideal point in a predetermined constellation said received signal corresponds;
   (b) rotating said received signal by an operand defined by an ideal point to which said received signal corresponds wherein an application of said operand to the ideal point would rotate the ideal point to an x axis;
   (c) determining x and y coordinates of said received signal after rotation;
   (d) from said determined x and y coordinates of said rotated received signal, determining at least $\bar{x}$, $\overline{x^2}$, $\bar{x}^2$, and $\overline{y^2}$, where
   $\bar{x}$ is an average of the x coordiante of the rotated received point,
   $\bar{x}^2$ is a square of $\bar{x}$,
   $\overline{x^2}$ is an average of a square of the x coordinate of the rotated received point, and $\overline{y^2}$ is an average of a square of the y coordinate of the rotated received point;

(e) from said determined ideal point, determining at least $x_o^2$ where $x_o^2$ is a square of the x coordinate of the ideal point after rotation by said operand; and (f) from at least said $\overline{x}$, $\overline{x}^2$, $\overline{x^2}$, $\overline{y^2}$, and $x_o^2$, determining at least an index of said impairment other than phase jitter, wherein an average effect of said impairment other than phase jitter on a coordinate of said received rotated signal is zero.

10. A method according to claim 9, wherein:

said impairment other than phase jitter is at least amplitude jitter; and an index of said amplitude jitter is determined to equal $$((\overline{x^2} - \overline{y^2})/(2\overline{x}^2 - x_o^2)) - 1.$$

11. A method according to claim 9, wherein:

said impairment other than phase jitter is at least noise; and an index of said noise is determined to equal $$(\overline{x^2} + \overline{y^2} - x_o^2(\overline{x^2} - \overline{y^2})/(2\overline{x}^2 - x_o^2))/2.$$

12. A method according to claim 10, wherein:

said impairment other than phase jitter is at least noise; and an index of said noise is determined to equal $$(\overline{x^2} + \overline{y^2} - x_o^2(\overline{x^2} + \overline{y^2})/(2\overline{x}^2 - x_o^2))/2.$$

13. A system for determining at least phase jitter in a data communication channel which is transmitting at least QAM signal constellations at predetermined bit rates, said channel having at one time at least phase jitter, and two other independent impairments, the system comprising:

(a) a QAM receiver for receiving signals transmitted by a QAM transmitter and for detecting coordinates of a point of said constellation which was transmitted;

(b) means for correlating said received signals with ideal signal constellation points and deriving a rotational operand therefor which will rotate said ideal points to an x axis;

(c) means for operating on said received signals and said ideal signal points by said operand to provide at least a received rotated x coordinate for each said received signal, and a rotated ideal point $x_o$ for each said ideal constellation point;

(d) means for averaging the received rotated x coordinate of the received signals; and (e) means for determining at least an index of said phase jitter in said channel from at least said $x_o$ point and an average of said received rotated x coordinates of signals corresponding to said $x_o$ point, wherein an average effect of each of said two other impairments on a coordinate of said received rotated signal is zero.

14. A system according to claim 13, wherein said means for operating on said received signals further provides a received rotated y coordinate, said system further comprising:

(f) means for determining values $\overline{x}^2$, $\overline{x^2}$, and $\overline{y^2}$ for said received and rotated points, where $\overline{x}^2$ is a square of $\overline{x}$, $\overline{x^2}$ is an average of a square of the x coordinate of the rotated received point, and $\overline{y^2}$ is an average of a square of a y coordinate of the rotated received point; and (g) means for determining a value $x_o^2$, where $x_o^2$ is a square of the x coordinate of the ideal point after rotation by said operand.

(h) means for determining at least an index of amplitude jitter from $\overline{x}^2$, $\overline{x^2}$, $\overline{y^2}$, and $x_o^2$.

15. A system according to claim 14, further comprising:

(i) means for determining an index of noise from said index of amplitude jitter and from $\overline{x}^2$, $\overline{x^2}$, $\overline{y^2}$, and $x_o^2$.

16. A system according to claim 13, wherein said means for operating on said received signals further provides a received rotated y coordinate, said system further comprising:

(h) means for determining values $\overline{x}^2$, $\overline{x^2}$, and $\overline{y^2}$ for said received and rotated points, where $\overline{x}^2$ is a square of $\overline{x}$, $\overline{x^2}$ is an average of a square of the x coordinate of the rotated received point, and $\overline{y^2}$ is an average of a square of a y coordinate of the rotated received point; and (i) means for determining a value $x_o^2$, where $x_o^2$ is a square of the x coordinate of the ideal point after rotation by said operand.

(j) means for determining at least an index of noise from $\overline{x}^2$, $\overline{x^2}$, $\overline{y^2}$, and $x_o^2$.

* * * * *